United States Patent
Dang et al.

[19]

[11] Patent Number: 6,115,041

[45] Date of Patent: Sep. 5, 2000

[54] DISPLAY SCREEN MANAGEMENT APPARATUS AND METHOD

[75] Inventors: Luan Dang, Milpitas; Bae-Sik Chon, San Jose, both of Calif.

[73] Assignee: Nortel Networks Corporation

[21] Appl. No.: 08/998,231

[22] Filed: Dec. 24, 1997

[51] Int. Cl.[7] ...................................................... G06F 3/14
[52] U.S. Cl. ........................................ 345/339; 345/353
[58] Field of Search .................................... 345/339, 344, 345/346, 353, 356, 326

[56] References Cited

U.S. PATENT DOCUMENTS

| | | | |
|---|---|---|---|
| 5,283,864 | 2/1994 | Knowlton | 345/356 |
| 5,305,435 | 4/1994 | Bronson | 345/356 |
| 5,627,960 | 5/1997 | Clifford et al. | 345/356 |
| 5,781,192 | 7/1998 | Kodimer | 345/346 |

*Primary Examiner*—Raymond J. Bayerl
*Assistant Examiner*—David E. Brown
*Attorney, Agent, or Firm*—Carr & Storm, L.L.P.

[57] ABSTRACT

A display screen manager and management method is disclosed, along with a storage and management system, media, computer and terminal incorporating the same. The disclosed screen manager will be capable of accessing a plurality of screen objects, each defining at least one screen displayable on a display unit of a terminal or device. Each screen object will include both data and procedures for painting the actual screen, defining the role of any softkeys, and handling user input and other messages directed to the screen object while it is being displayed to the user. The screen manager will also include a stack data structure for retaining the active screen object at the top of the stack (i.e. the screen object defining the active screen being displayed) as well as dormant (i.e. previously active and unretired) screen objects invoked as the user interacts with the terminal. Dormant screen objects will also be retained in the stack positioned in an invocation order as the user traverses the screen hierarchy. Also disclosed is a message router in communication with this stack to relay messages specifying user input (such as a key press), application originated broadcasts or system responses to message handler logic contained in the active screen object or module, which greatly simplifies the interfacing couplings required to direct messages to the active screen object.

25 Claims, 6 Drawing Sheets

DISPLAY SCREEN MANAGEMENT APPARATUS AND METHOD

FIELD OF THE INVENTION

This invention is directed generally to memory management and programming techniques, and is particularly concerned with screen object storage management for a menu-driven application which leverages a stack data structure and related organizational techniques.

DESCRIPTION OF THE RELATED ART

As the dawn of the next millennium approaches, the marketplace has witnessed an ever increasing demand for intelligent, intuitive devices which strive to offer consumers a vast array of features while remaining easy to use. Most consumer product designers learned long ago that providing a dedicated button to service every feature can make that product difficult, unwieldy and undesirable to use. Likewise, littering the user interface with irrelevant information results in sensory overload, which again cuts against the product's use and marketability.

Figure 1:
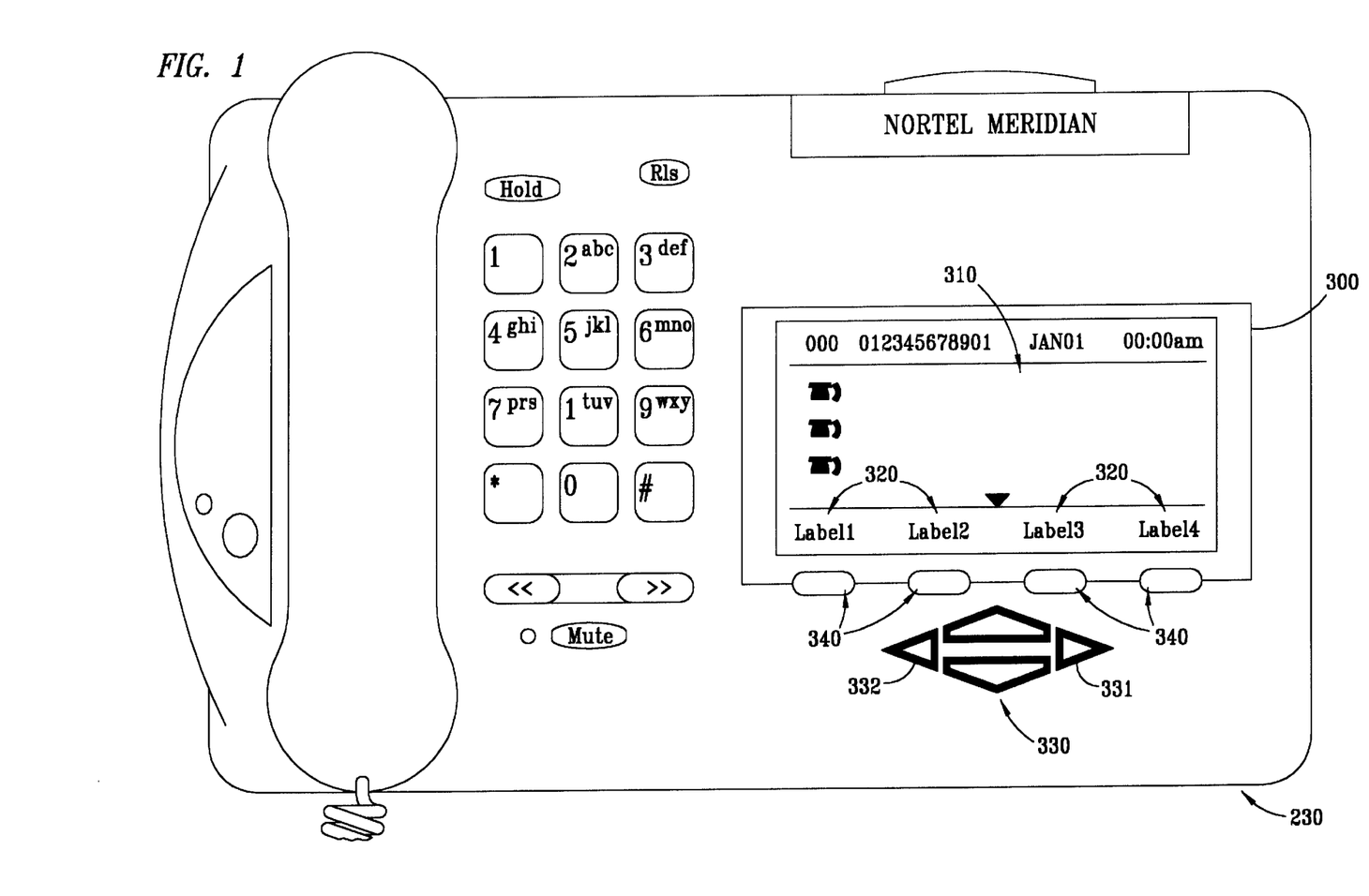
FIG.1 is a simplified plan view of a screen terminal which may implement the present invention.

In response, product designers have designed screen-based interactive devices. These devices typically feature a menu-based user interface through which the user navigates and interacts with using a limited number of context-sensitive buttons or softkeys. By means of example, FIG. 1 depicts a screen-based PBX telephone terminal 230 incorporating an LCD display 300. LCD display 300 has a multiline alphanumeric display area 310 to display a sample screen or menu 350 defining four softkey labels 320 for identifying the functionality of corresponding four softkeys 340 within the context of the screen. In this example, fixed navigation controls 330 including left arrow navigation key 332 and right arrow navigation key 331, which permit the user to scroll through information presented on the current screen 350, retain their function regardless of which screen is currently active (i.e. displayed on the display 300). Likewise, in order to impart a familiar phone interface to users, conventional keypad button set 360 and handset 370 is provided as well.

Figure 6A:
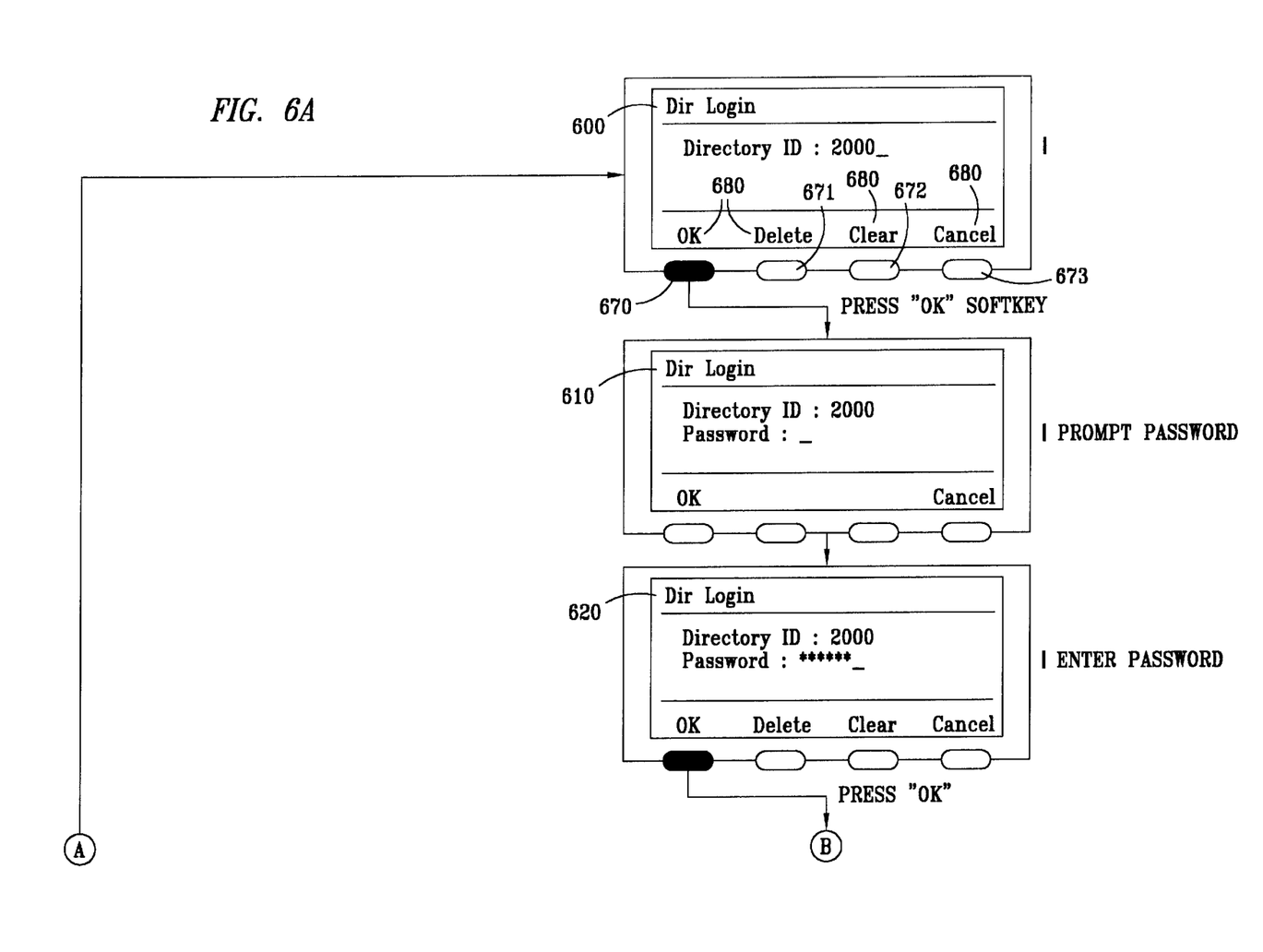
FIGS. 6 and 7 are example screen flow diagrams for the terminal shown in FIG. 1.
Figure 6B:
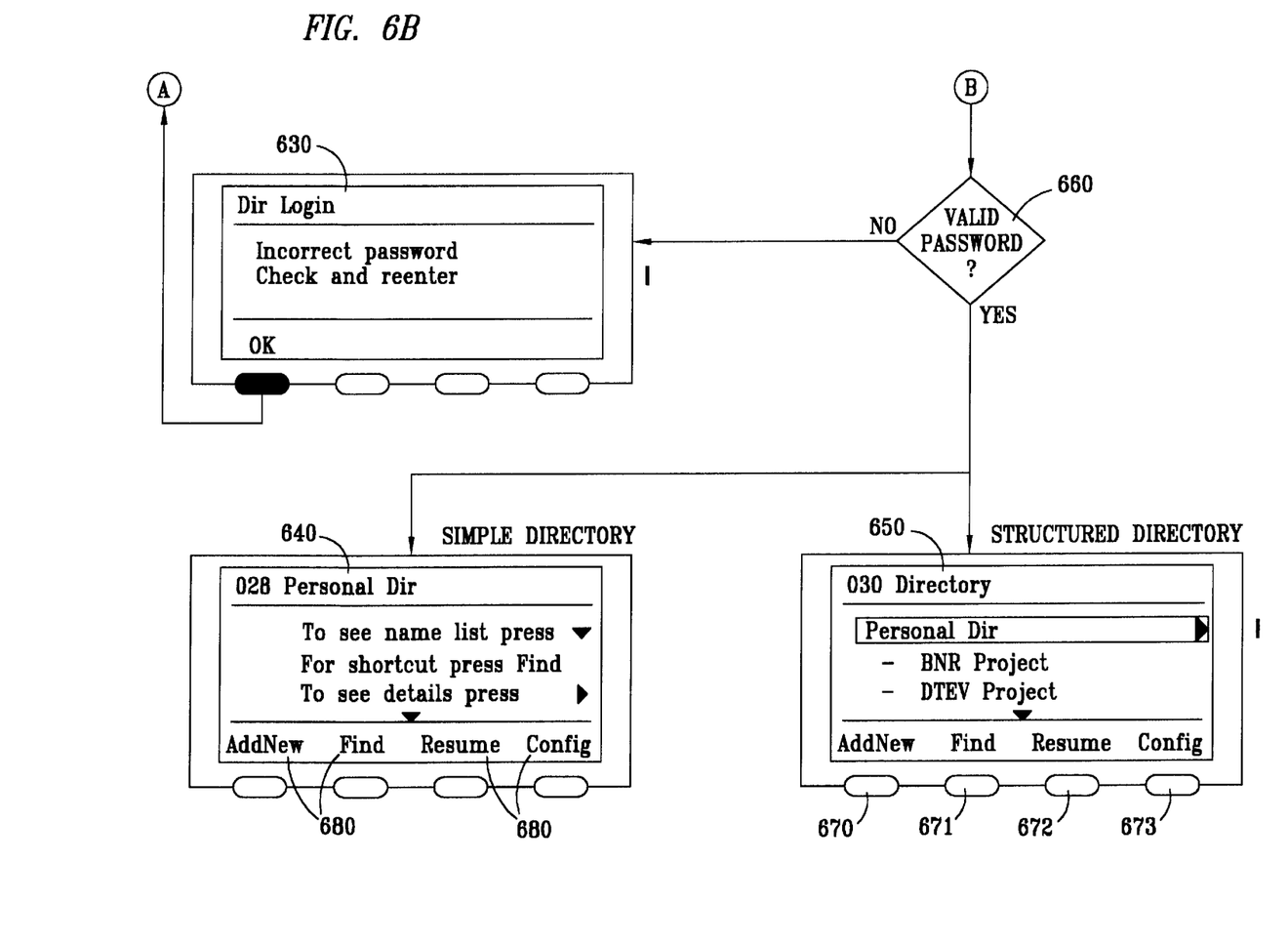

A sample screen flow of a directory login sequence for the telephone terminal 230 of FIG. 1 is shown in FIG. 6. Referring to FIG. 6, the user is initially presented with login screen 600 which prompts for a user id associated with a custom or predefined telephone directory. The screen 600 includes labels 680 identifying the function of each of the four softkeys 670–673 within the context of the active screen.

Once the user responds to the prompt by entering the desired user id, she depresses button 670 (the actual keypress is denoted by a stippled button) and the terminal 230 next displays screens 610 and 620 in succession. As shown in FIG. 6, password checking is then performed at decisional stage 660 and then one of three screens 630, 640 and 650 are shown to user based on her previous input and predetermined rules established by the underlying application or control logic (not shown).

As detailed above with reference to FIGS. 1 and 6, interactive screen interfacing is desirable since it permits sophisticated, interactive feature control of the underlying device without undue button and information clutter. As a result CRT and LCD screens with accompanying softkeys are popping up on a whole range of consumer and office products, such as telephone sets (including the PBX extension depicted in FIG. 3), microwave ovens and even toasters.

Despite these benefits, it has heretofore remained a difficult task to write reusable and extensible software for controlling screen interfaces. This is because the screen or menu hierarchy had to be globally defined by the programmer. More importantly, messaging between the user, operating system or other programs and the active screen typically involved utilizing complex connection intermediary paradigms such as switching or lookup tables which monitored the state of the control software or control logic. As is well known in the art, such intermediaries may experience near exponential growth in connection complexity even when minor updates of the screen control software are specified. And the use of such intermediaries may exact unacceptable performance hits on overall system performance and responsiveness.

Alternatively, screen interface programmers seeking to maximize performance have chosen to hard code messaging routes, which of course tightly couples the control software and makes it difficult to modify, correct or update.

Accurate message routing is further complicated when a central server executes multiple screen interface control applications simultaneously in order to service multiple screen terminal adjuncts.

It would, therefore, be desirable to develop a screen management technique that offers the messaging flexibility of intermediaries without incurring the resulting design complexity and performance hits described above. It would be also desirable to develop a screen management technique which lends itself to portability and re-use, especially in conjunction with object-oriented design tools while remaining relatively memory efficient.

SUMMARY OF THE INVENTION

In accordance with these and related desires, the present invention is directed to what Applicants believe is an unique and non-obvious display screen manager and management method, along with a storage and management system, media, computer and terminal incorporating the same. According to the present invention, the screen manager will be capable of accessing a plurality of screen objects, each defining at least one screen displayable on a display unit of a terminal or device. Each screen object will preferably include both data and procedures for painting the actual screen, defining the role of any softkeys, and handling user input and other messages directed to the screen object while it is being displayed to the user.

The screen manager of the present invention will also include a stack data structure for retaining the active screen object (i.e. the screen object defining the active screen being displayed) as well as dormant (i.e. previously active and unretired) screen objects invoked as the user interacts with the terminal. Preferably, the active screen object will be stored at the top of the stack. Also, preferably, dormant screen objects will also be retained in the stack positioned in an invocation order as the user traverses the screen hierarchy. This stack organization will inherently produce a record of the user's traversal through the screen hierarchy without the need to actively monitor or record the user's actions.

Moreover, the present invention also features a message router in communication with this stack to relay messages specifying user input (such as a key press), application originated broadcasts or system responses to message handler logic contained in the active screen object or module. This greatly simplifies the interfacing couplings required to direct messages to the active screen object.

When the message router routes an inbound message to the active screen object (specifically the message handler thereof) the message handler may process the message in one of three ways with respect to related screen objects. First, it may simply process the message using internal or external procedures relative to the message handler without manipulating the stack. Second, it can invoke a stack manipulation operation defined within either the message handler itself or external to the active screen object (such as through an independent stack manager utility) to instantiate and display another screen object on the terminal display. This will be referred to herein as a screen push or push operation. When a push operation occurs, the newly designated active screen object will be stored at the top of the stack and will selectively update the screen imparted to the user by sending appropriate outbound messages to the display handler actually responsible for drawing and maintaining the screen on the terminal or device display.

Third, it can invoke another stack manipulation operation in which the current active screen is removed from the stack and immediately preceding dormant screen object is designated as the active screen object. This will be referred to herein as a screen pop or pop operation. As in the case of the aforementioned push operation, when a pop operation is carried out, it may be necessary for the message handler of the newly active screen object to send appropriate redraw or update outbound messages to the display handler.

Since each dormant screen object is preferably independently accessible within the object stack, the message handler of the active screen object may direct the stack manager to discard screen objects from the stack while retaining the relative invocation order of remaining screen objects within the stack (including the active screen object) in an effort to overcome storage inefficiencies produced by a pure stack paradigm.

In one embodiment, inactive screen objects are always stored in a screen object repository accessible to the aforementioned object stack and stack manager. This architecture provides quick response to user traversal into previously undisplayed screens within the screen hierarchy. However, use of such a repository adds additional memory overhead. Thus, in another embodiment, inactive screen objects are instantiated as needed (on-the-fly). When retired by a pop operation, the newly inactivated screen object can be released or discarded from memory to conserve limited memory resources, or in the alternative, be placed in the aforementioned screen repository to speed up subsequent recall operations at the expense of additional storage requirements.

Other aspects and features of the present invention will become apparent to those ordinarily skilled in the art upon review of the following description of the specific preferred embodiments of the invention in conjunction with the accompanying figures.

BRIEF DESCRIPTION OF THE DRAWINGS

The features of the invention, as well as the invention itself may be best understood with reference to the following drawings in which like numbers indicate like parts, to which.

DETAILED DESCRIPTION OF THE PREFERRED EMBODIMENTS

Figure 2:
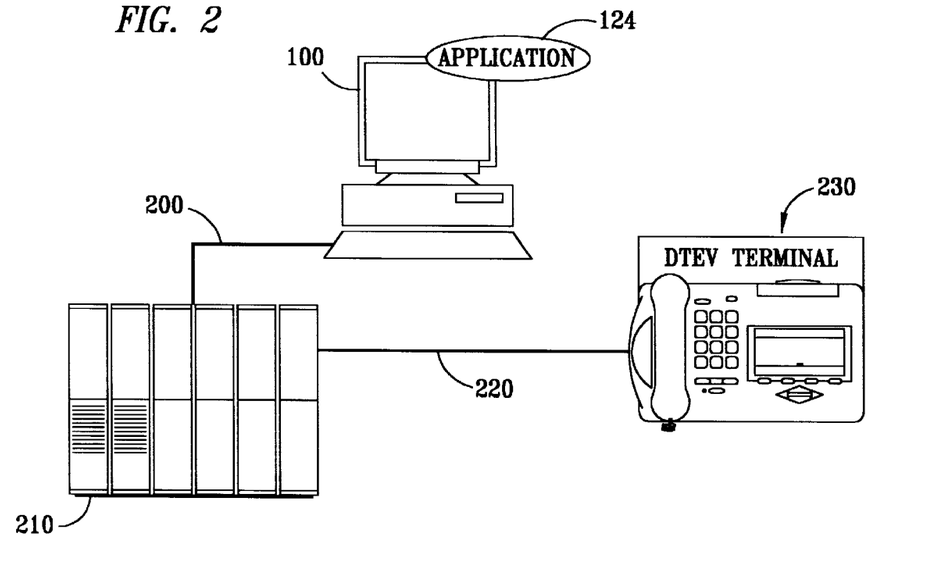
FIG. 2 is a system diagram of a PBX implementing a first embodiment of the present invention.

FIG. 2 is a simplified system diagram of a PBX ("Private Branch Exchange") implementing a first embodiment of the present invention. As shown therein, screen-based PBX desktop extension or terminal 230, which includes a display 300 (FIG. 1) for displaying one or more screens 350 of information to a user, is coupled to a central PBX switch 210 through switched bi-directional communications link 220. Link 220 includes sufficient capacity for transferring voice and data, including screen control and terminal activity messages, between the switch 210 and the terminal 230. In this embodiment PBX switch 210 handles conventional PBX call processing tasks, including call setup, switching, and call breakdown involving terminal 230 and/or other extension(s) (not shown) serviced by the PBX. Although not shown for purposes of clarity, PBX switch also preferably maintains a wired connection with other telecommunication networks including a private-line carrier network and/or the public switched telecommunications network accessed through wired connection to the local telephone company's central office.

According to this embodiment, display screen management for terminal 230 according to the present invention is implemented through the assistance of screen control application 124 executing on general purpose digital computer 100. In order to capture inbound messages indicating e.g. a change in the status of terminal 230 (such as a keypress), or deliver outbound screen messages to the terminal 230, computer 100 maintains at least a transient bi-directional communications link to terminal 230 over wired connection 200 to PBX switch 210. In turn PBX switch 210 establishes a connection to terminal 230 via the aforementioned link 220 to complete a communications pathway between the screen control application 124 residing on computer 100 and the terminal 230 whose screen interface it is controlling.

In this embodiment, screen control application 124 resides on the computer 100 in order to ease processing requirements within the terminal 230 and decrease components and development costs therefor. Moreover, since computer 100 may be responsible for servicing the interfaces of several terminals simultaneously, moving the screen control application 124 to the computer 100 itself facilitates centralized maintainability and control of the application 124, as well as fostering deployment of a standardized interface for all screen terminals serviced by the PBX system.

However, it should be realized that the teachings of the present invention should not be so limited and, in fact screen control software and/or equivalent logic for carrying out screen management according to the present invention may be instead located within the terminal 230 itself, within switch 210, or anywhere message communications can be maintained between the software or logic and the screen terminal 230 it is controlling.

Also, as discussed hereinabove, it should be noted that components of the present invention including, but not limited to aforementioned screen management functionality may be conveniently implemented using a general purpose digital computer(such as computer 100) programmed according to the teachings of the specification, as would be apparent to those ordinarily skilled in the computer arts.

Appropriate software coding can be readily prepared based on the teachings of the present disclosure as will be apparent to those ordinarily skilled in the art. Though not presently preferred, the present invention can also be implemented by the preparation of the application specific integrated circuits or by interconnecting the appropriate network of conventional components, devices and circuits and will be readily apparent to those ordinarily skilled in the art.

Figure 3:
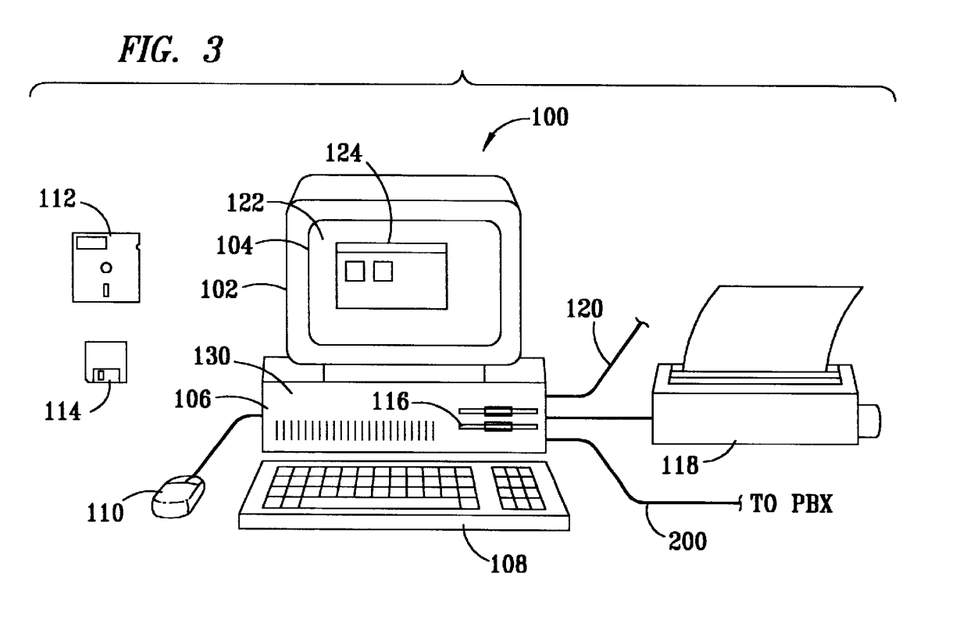
FIG. 3 is a system diagram of the computer of FIG. 2 implementing the first embodiment of the present invention.

FIG. 3 shows in more detail the computer 100 used in the first embodiment of the present invention. The computer 100 comprises a processor 106, random access memory (RAM) 130, and read-only memory (ROM) and/or other components. The computer 100 may be coupled to I/O devices, such as a monitor 102, keyboard 108, mouse device 110, fixed and/or removable data storage devices 112 and 114, and printer 118. The computer 100 could also be coupled to other I/O devices, including a local area network (LAN) or wide area network (WAN) via interface cable 120. In this embodiment, computer 100 also includes interfacing capabilities sufficient for it to maintain the wired connection 200 to the PBX switch 210.

Those of ordinary skill in the art will recognize that any combination of the above components, or any number of different components, peripherals, and other devices, may be used with the computer 100.

Generally, the computer 100 operates under control of an operating system 122, which is represented by the display 104 on the monitor 102. The present invention is preferably implemented using a screen control application 124, which is visually represented by the window displayed on the monitor 102 operating under the control of the operating system 122. The operating system 122 and application 124 are loaded from a data storage devices 112 and/i 14 into the memory 130 of the computer 100 for use during actual operations. In alternatively embodiments, the application 124 may be loaded from a network into the memory 130.

In the preferred embodiments of the present invention, the operating system 122 and the screen control application 124 are usably embodied in a computer-readable medium, e.g., data storage devices 112 and/or 114 which could include one or more fixed or removable primary or secondary data storage devices, such as RAM 130, a floppy disk, a hard disk drive, a CD-ROM, tape, etc. Further, the operating system 122 and the screen control application 124 are comprised of instructions which, when read and executed by the computer 100, causes the computer 100 to perform the steps necessary to implement and/or use the present invention. Those of ordinary skill in the art will recognize that many modifications may be made to this configuration, including the number, size, and types of components, without departing from the scope of the present invention.

In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

In each of the below-described embodiments, steps according to the present invention are embodied in machine-executable software instructions, and the present invention is carried out in a processing system by a processor executing the instructions, as will be described in greater detail below. In other embodiments, hardwired circuitry may be used in place of, or in combination with, software instructions to implement the present invention.

Figure 4:
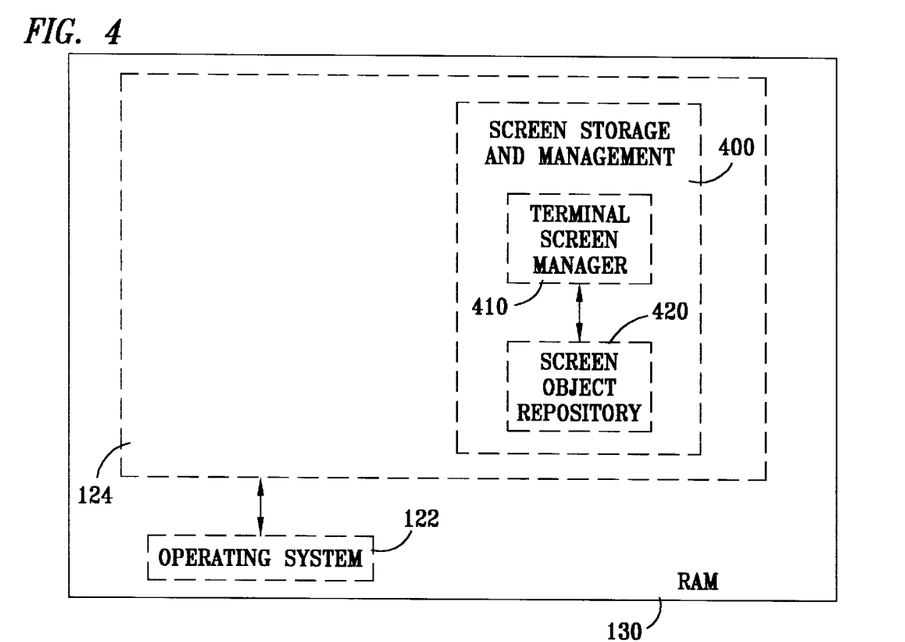
FIG. 4 is a schematic view of the RAM 130 of the computer of FIGS. 2–3 implementing the first embodiment of the invention.

FIG. 4 schematically illustrates the RAM 130 of the computer 100 implementing the first embodiment of the invention. As shown in this figure, RAM 130 preferably stores operating system 122 and screen control application 124 at least on a temporary basis. As a part of routine processing, operating system 122 will, from time to time, establish communications with screen control application 124 to notify it of inbound messages received from external sources such as terminal 230, as well as changes in state or status of computer 100 or operating system 122 which are relevant to the application 124.

Screen control application 124 preferably includes screen storage and management unit 400. In this embodiment, screen storage and management unit 400 includes a display screen manager 410 for managing active, dormant, and residual screen objects defining screens which will be remotely displayed on the display 300 of the terminal. The screen storage and management unit includes a display screen manager 410 for managing the active and dormant screen objects within the aforementioned object stack 520 (See FIG. 5). The screen storage and management unit 400 also includes a screen object repository 420 communicating with the screen manager for storing at least the inactive screen objects. These inactive screen objects, together with the active and any dormant screen objects positioned in the stack together define the hierarchy of the screen interface for the terminal 230. As will be discussed in greater detail hereinbelow with respect to FIG. 5, the screen manager 410 according to the present embodiment will selectively retrieve one or more inactive screen objects defining the desired screen characteristics from the screen object repository 420 for placement in the screen object stack 520. Likewise, the screen manager 410 will selectively retire one or more active screen objects from the stack when the screens they define no longer are of interest to the terminal user.

Figure 5:
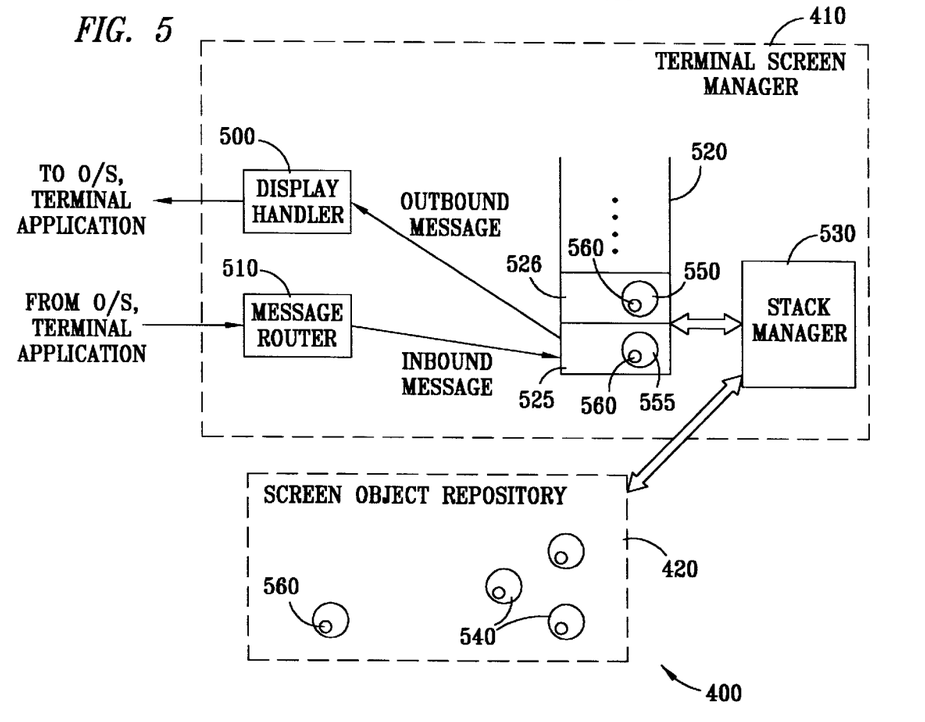
FIG. 5 is a more detailed schematic view of the screen storage and management system shown in FIG. 4.

FIG. 5 is a more detailed diagram which schematically shows the internal components and relationships between the screen manager 410 and the screen object repository 420 of the screen management and storage unit 400 according to the present embodiment of the invention. Turning first to the screen object repository 420, as discussed above, this screen object repository at least contains the inactive screen objects 540, each defining at least one displayable screen constituting part of the screen hierarchy of the terminal screen interface. As discussed above, according to this embodiment, the inactive screen objects 540 include all screen objects defining those screens which either have yet to be displayed on the terminal 230 or have been retired from the stack 520 through invocation of a screen pop operation defined hereinabove. This pop operation will be discussed in greater detail hereinbelow.

As shown in FIG. 5, the inactive screen objects 540, together with the dormant 550 and active screen objects 550 positioned in the screen object stack 520 each contain a message handler 560 defining procedures, logic or routines for handling inbound operating system, application and/or terminal messages routed to the screen object while it is active (i.e. the screen it defines is being displayed on the display 300 of the terminal 230). These messages typically convey status, change in status, or action information related to the terminal 230 within the context of the screen currently being displayed to the user. These messages may also convey information concerning PBX switch 210 (FIG. 3), the condition of links 200, 220 or the status of computer 100 which is relevant to the screen management and storage unit 400 of the screen control application 124 as is easily understood by those ordinarily skilled in the art.

Each message handler 560 of the screen objects may also include appropriate procedures, logic, or routines for broadcasting outbound action or status messages to the operating system 122 or other applications executing on the computer 100, not to mention PBX switch 210 and the terminal 230 as is known in the art. In addition, these message handlers may include procedures, logic or routines for selectively invoking stack manipulation operations if they determine from an incoming message that a new screen needs to be displayed on the terminal 230.

It should be noted here that the screen objects 540, 550 and 555, which collectively constitute the screen hierarchy of the terminal user interface of the present embodiment, preferably take the form of discrete objects within a terminal screen class and/or interface framework defined via object-oriented software development techniques. Beyond the conventional benefits derived from using object-oriented development techniques, the use of screen objects is especially preferable here since the hierarchical relationship need only be expressed locally within the procedures of each object, and a base class screen object can be used as a memory usage template to help size the stack 520 and individual slots 525, 526 therein.

Alternatively, the screen objects can take the form of discrete modules, packages or other software structures developed under the procedural model, as long as the aforementioned message handler functionality is included in each, as will be readily apparent to those ordinarily skilled in the art.

Still referring to FIG. 5, the display screen manager 410 of the present embodiment includes a last-in, first-out screen object stack 520 holding at least the active screen object as well as a stack manager 530 for intercepting stack manipulation operation calls issued by the message handler of the active screen object 555, positioned at the logical top of stack 520. In turn, the stack manager 530 will parse the stack manipulation operation call and perform a screen push or a screen pop operation on the stack 520. Specifically, when a screen push operation is requested, the stack manager 530 will retrieve a copy of the desired inactive screen object 540 from the screen object repository and position it at the top of the stack 525 as the active screen object. At the same time, the previously active screen object will be pushed one slot into a dormant slot 526 of the stack 520.

During a screen pop operation, the stack manager 530 will retire the active screen object 555 positioned at the top of the stack (slot 525) by pushing it off of the stack 520 (please note that, in this embodiment, the original, inactive version of this screen object is still maintained in the screen depository 420). The remaining dormant screen objects are then popped logically upward in the stack in well-known last-in, first-out fashion, with the dormant screen object occupying the top of the stack being redesignated as the active screen object.

It should be noted here that the functions of the stack manager 530 can be incorporated into the message handlers of the screen objects themselves, as will be apparent to those ordinarily skilled in the art, thereby eliminating the need for an independent stack manager. However, this alternative may not be preferable when embodiments requiring relatively short and predictable screen object sizes or fairly uniform message handling times.

It should also be noted here that while the object stack 520 described above is a last-in first-out data structure, the active slot 525 and each dormant slot 526 remains directly accessible. Further, should the active screen object 555 message handler 560 determine that dormant screen objects 550 retained in the stack 520 are no longer needed, they can be expelled by the aforementioned stack manager 530 or by this message handler directly without disturbing the relative positioning of the remaining active and dormant screen objects stored in the object stack. Thus, the object stack 520 of the present embodiment is deemed to be collapsible.

To briefly illustrate, suppose the stack (from top to bottom) contains screen objects A,B,C,D. Assume further that the message handler for the active screen object, object A, determines that screen C will no longer be needed. In this embodiment, the message handler of screen object A directs the stack manager 530 to expel screen object C from the stack. Thereafter, the stack manager collapses the stack to retain the relative invocation ordering of the remaining stack members. Thus, after collapse, the resulting stack will contain screen objects A,B,D in invocation order.

One of the benefits conferred using the screen object stack 520 of the present embodiment is its ability to inherently capture an invocation order of screen objects as well as the user's traversal through the screen hierarchy. Again taking the screen flow diagram of FIG. 6 as an example, the screen manager 410 of the present embodiment would first make a copy of the screen object defining screen 600 in the repository 420 and place it in the top of the stack 520 (slot 525), thereby defining it as the active screen object 555. Next, when the message handler of the active screen object receives an inbound message that a keypress of softkey 670 has occurred, it invokes either directly or indirectly through stack manager 530, a screen push operation in which a copy of the screen object defining the screen 610 located in repository 420 is placed onto the top 525 of the stack 520. At the same time, the screen object defining screen 600 is pushed into dormant slot 526.

Still referring to FIG. 6, Once user input commences, the screen object defining screen 620 is pushed onto the stack 520 as the new active screen object according to this embodiment. Thereafter, the message handler for the active screen object will perform password validation, using known procedures internal or external to the message handler, and then push the appropriate screen object defining the screen 630, 640 or 650 onto the stack 520 based on user input captured during the display of screens 600 and 620. Assuming that screen 640 is determined to be appropriate by the message handler of the active screen object defining screen 620, the screen object defining the screen 640 is pushed onto the stack 520 as the active screen object. At this point, the stack 520 includes copies of the screen objects defining screens 600, 610, 620 and 640 in the order in which they were invoked in response to the user.

Assuming instead after password validation, screen 650 is determined to be appropriate for display by the message handler of the active screen object defining screen 620, the screen object defining screen 650 is pushed onto the stack 520 as the active screen object. In this situation, the message for the active screen object defining screen 650 determines that the initial entry screens need not be retained in the object stack 520. Thus, the screen objects defining screens 600, 610 and 620 will be removed from the stack by the aforementioned stack manager and only the active screen object defining screen 650 will be retained in order to minimize memory requirements.

Figure 7:
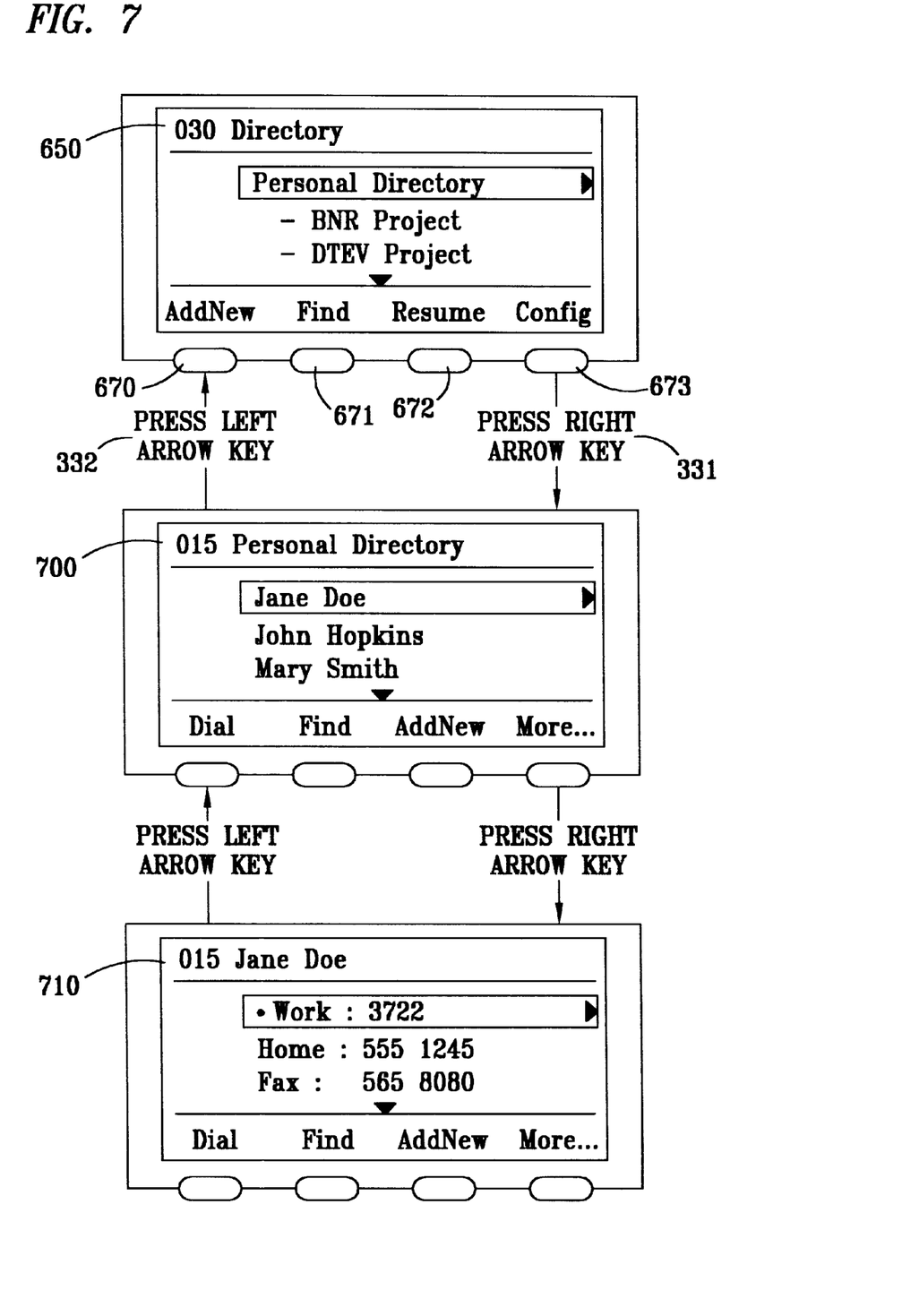

Turning now to FIG. 7, FIG. 7 is a screen flow diagram when screen 650 of FIG. 6 is initially presented to the user. When the user depresses the right arrow navigation key 331 (FIG. 1) disposed on the terminal 230, the message handler of the active screen object defining screen 650 will direct the stack manager 530 to push the screen object defining screen 700 onto the top of the object stack 520. At this point, the object stack includes copies of the screen objects defining screens 650 and 700 in invocation order, with the screen object defining screen 700 being designated as the active screen object.

Next, while screen 700 is being displayed on the display 300 of the terminal 230, should the user depress the left arrow navigation key 332 the active screen object defining screen 700 is popped from the stack 520 and the dormant screen object defining screen 650 is restored as the active screen object. At this point, the object stack just includes copies of the screen object defining screen 650 (since screen objects defining screens 600, 610 and 620 were deemed by the message handler of the screen object defining screen 650 to be no longer needed when such screen object was originally activated).

In the alternative, should the right arrow navigation key 331 be pressed while the screen 700 is being displayed, another push operation is invoked to place the screen object defining screen 710 onto the object stack 520 as the active screen object, and the object stack includes copies of the screen objects defining screens 650, 700 and 710 in invocation order (from bottom to top).

Screen object message routing to the embodiment shown in FIG. 5 is accomplished through the inbound message router 510 and the outbound message display handler 500. Architecturally, the message router 510 and the display handler 500 are shown both being included as part of the display screen manager 410, but it should be readily apparent to those skilled in the art that these messaging intermediaries can exist independently outside of the display screen manager 410, the screen management and storage unit 400 and even computer 100, as long as messages can flow between them and the active screen object retained in the screen object stack. For example, though not preferred, they can operate separately or together within the terminal 230 or PBX switch 210, assuming of course that sufficient computing resources exist for the handler 500 and router's 510 concurrent execution with other processing tasks assigned to the device(s) in which they reside.

In almost all cases, incoming messages relevant to the screen interface of the terminal 230 are to be handled by the message handler procedures specified in the active screen object 555. Moreover, it is the message handler of the active screen object which issues outbound status or action messages, typically in response to one or more incoming message. Therefore, by always placing the active screen object in a predetermined portion of memory (here, at the top slot 525 of screen object stack 520), inbound and outbound message routing is greatly simplified over known techniques, even when complex screen hierarchies are involved. This is because the message router 510 will always forward inbound screen interface messages to the top of the stack, regardless of which screen object is actually retained therein. And, the display handler 500 will always look for screen interface messages to originate from the same static location in memory (i.e. the top 525 of the stack 520).

Though FIG. 5 only shows a single stack 520 storing the active and dormant screen objects for a single terminal 230, the teachings of the present invention are not intended to be so limited, and in fact can be easily extended to service the screen interfaces of multiple terminals, even where the screen interfaces are dissimilar. In this case, in order to retain simplified message routing as discussed hereinabove, a separate screen object stack would be created for each terminal being served. A common screen object repository could be defined to hold those screen objects needed for each type of screen interface being serviced. Even a common inbound message router 510 may be used, as long as it can at least sequentially access every screen object stack created for servicing the plural terminals.

Furthermore, at least in the single terminal case, the stack manager 530 or the message handler of the active screen object 555 of the above disclosed embodiments can manipulate the screen object repository 420. For example, in limited memory situations, instead of copying a screen object from the repository and placing the copy into the stack 520 as contemplated hereinabove, the stack manager 530 can instead use pointers or other pass by reference techniques to move the desired screen object out of the repository 420 and into the stack 520 data structure. Likewise, during a screen pop operation, the active screen object can be moved back into the screen object repository.

Furthermore, in the above described embodiments, a screen repository 420 is used to store inactive screen objects 540. However, it should be realized that the teachings of the present invention are not so limited, and that screen object management according to the present will support on-the-fly screen object instantiation and discard as is well known in the art as long as acceptable display update performance is maintained on the remote terminal 230. Further, the screen object repository 420 may be utilized in this alternative embodiment to store previously created and retired screen objects so that subsequent screen object display requests will not require re-creation of the retired screen objects (instead they will be drawn from the screen repository).

While the invention is described above in terms of specific preferred embodiments and associated drawings, those of ordinary skill in the art will recognize that the invention can be practiced in other embodiments as well. It is felt therefore that the invention should not be limited to the disclosed embodiments, but rather should be limited only by the spirit and scope of the appended claims.

What is claim is:

1. A screen manager for a plurality of screen objects, the manager comprising:

a stack storing a first one of the plurality of screen objects as an active screen object, each of the plurality of screen objects including a message handler and defining at least one screen displayable on a terminal; and a message router in communication with said stack for relaying an inbound message to the active screen object, wherein the message handler of the active screen object selectively invokes a stack manipulation operation based on the relayed inbound message.

2. The screen manager of claim 1, further comprising a stack manager in communication with said stack for executing the stack manipulation operation responsive to the message handler of the active screen object.

3. The screen manager of claim 1, wherein the message handler of the active screen object executes the stack manipulation operation.

4. The screen manager of claim 1, wherein the stack manipulation operation comprises pushing a second one of the screen objects onto said stack as the active screen object.

5. The screen manager of claim 1, wherein the stack manipulation operation comprises popping the active screen object from said stack.

6. The screen manager of claim 1, further comprising a display handler in communication with said stack and the terminal for receiving an outbound message issuing from the message handler of the active screen object and manipulating the terminal based on the received outbound message.

7. A screen storage and management system, comprising:
   a repository of a plurality of screen objects, each screen object including a message handler and defining at least one screen displayable on a terminal;
   a stack in communication with said repository, said stack storing at least a first one of said screen objects as an active screen object; and
   a message router in communication with said stack for relaying an inbound message to said active screen object, wherein the message handler of said active screen object selectively invokes a stack manipulation operation based on the relayed inbound message.

8. The storage and management system of claim 7, further comprising a stack manager in communication with said stack for executing the stack manipulation operation responsive to the message handler of said active screen object.

9. The storage and management system of claim 7, wherein the message handler of said active screen object executes the stack manipulation operation.

10. The storage and management system of claim 7, wherein the stack manipulation operation comprises pushing a second one of said screen objects onto said stack as said active screen object.

11. The storage and management system of claim 7, wherein the stack manipulation operation comprises popping said active screen object from said stack.

12. The storage and management system of claim 7, further comprising:
   a display handler in communication with said stack and the terminal for receiving an outbound message issuing from the message handler of said active screen object and manipulating the terminal based on the received outbound message.

13. The storage and management system of claim 7, wherein each of said screen objects occupy a predetermined memory size.

14. A computer-implemented method for managing a plurality of screen objects, the method comprising the steps of:
   pushing a first one of the plurality of screen objects onto a memory stack as an active screen object, each of the plurality of screen objects including a message handler and defining at least one screen displayable on a terminal;
   relaying an inbound message to the active screen object; and
   selectively executing a stack manipulation operation by the message handler of the active screen object in response to the relayed inbound message.

15. The method of claim 14, wherein the stack manipulation operation comprises the steps of:
   pushing a second one of the screen objects onto the stack; and
   designating the second one of said screen objects as the active screen object.

16. The method of claim 14, wherein
   the stack includes a third one of the screen objects adjacent the active screen object; and
   wherein the stack manipulation operation comprises the steps of:
      popping the active screen object from said stack; and
      designating the third one of said screen objects as the active screen object.

17. The method of claim 14, further comprising the steps of:
   receiving an outbound message issuing from the active screen object; and
   manipulating the terminal based on the received outbound message.

18. An article of manufacture for use in a computer system in communication with a terminal, the computer screen system defining a processor and a plurality of screen objects, the article of manufacture comprising a computer usable medium including:
   computer readable program code embodied in the computer useable medium for causing the processor to push a first one of the plurality of screen objects onto a memory stack as an active screen object, each of the plurality of screen objects including a message handler and defining at least one screen displayable on a terminal;
   computer readable program code embodied in the computer useable medium for causing the processor to relay an inbound message to the active screen object; and
   computer readable program code embodied in the computer useable medium for causing the processor to selectively execute a stack manipulation operation based on the relayed inbound message.

19. The article of manufacture of claim 18, wherein the stack manipulation operation is embodied in the computer useable medium, the stack manipulation operation comprising:
   computer readable program code embodied in the computer useable medium for causing the processor to push a second one of the screen objects onto the stack; and
   computer readable program code embodied in the computer useable medium for causing the processor to designate the second one of said screen objects as the active screen object.

20. The article of manufacture of claim 18, wherein
   the stack includes a third one of the screen objects adjacent the active screen object; and
   wherein the stack manipulation operation is embodied in the computer useable medium, the stack manipulation operation comprising:
      computer readable program code embodied in the computer useable medium for causing the processor to pop the active screen object from said stack; and
      computer readable program code embodied in the computer useable medium for causing the processor to designate the third one of said screen objects as the active screen object.

21. The article of manufacture of claim 18, wherein the computer useable medium further comprises:
   computer readable program code embodied in the computer useable medium for causing the processor to receive an outbound message issuing from the active screen object; and
   computer readable program code embodied in the computer useable medium for causing the processor to manipulate the terminal based on the received outbound message.

22. A computer system in communication with a terminal, comprising:
   a processor; and
   a memory in communication with said processor, said memory comprising:
      a repository of a plurality of screen objects displayable on the terminal, each of the plurality of screen objects including a message handler;

a stack in communication with said repository, said stack storing at least a first one of said screen objects as an active screen object;

computer readable program code for causing the processor to relay an inbound message to the active screen object; and computer readable program code for causing the processor to selectively execute a stack manipulation operation based on the relayed inbound message.

23. The computer of claim 22, wherein the terminal comprises plural terminals.

24. The computer of claim 23, wherein said stack comprises plural stacks in a one to one correspondence with the terminals.

25. A screen terminal, comprising:

a display;

a processor controlling said display; and a memory coupled to said processor, said memory comprising:

a repository of a plurality of screen objects, each of said plurality of screen objects including a message handler and defining at least one screen displayable on said display;

a stack in communication with said repository, said stack storing at least a first one of said plurality of screen objects as an active screen object;

computer readable program code for causing the processor to relay an inbound message to the active screen object; and computer readable program code for causing the processor to selectively execute a stack manipulation operation based on the relayed inbound message.

* * * * *

UNITED STATES PATENT AND TRADEMARK OFFICE
CERTIFICATE OF CORRECTION

PATENT NO. : 6,115,041
DATED : September 5, 2000
INVENTOR(S) : Dang et al.

It is certified that error appears in the above-identified patent and that said Letters Patent is hereby corrected as shown below:

| | |
|---|---|
| Column 2, line 33 | Delete "an" and insert --a-- |
| Column 5, line 33 | Delete "and/i 14" and insert --and/or 114-- |
| Column 5, line 35 | Delete "alternatively" and insert --alternative-- |
| Column 6, line 53 | Delete "550" and insert --555-- |
| Column 7, line 61 | Delete "when" and insert --in-- |
| Column 8, line 35 | Delete "Once" and insert --once-- |
| Column 9, line 10 | After "332", insert --,-- |
| Column 10, line 24 | After "present", insert --invention-- |

Signed and Sealed this

Fifteenth Day of May, 2001

*Attest:*

NICHOLAS P. GODICI

*Attesting Officer*    *Acting Director of the United States Patent and Trademark Office*